US009705295B1

(12) United States Patent
Smith

(10) Patent No.: US 9,705,295 B1
(45) Date of Patent: Jul. 11, 2017

(54) SLIP CONDUIT CONNECTOR AND SYSTEM AND METHOD OF INSTALLING ELECTRICAL CONDUIT WITH A SLIP CONDUIT CONNECTOR

(71) Applicant: Bridgeport Fittings, Inc., Stratford, CT (US)

(72) Inventor: Lawrence J. Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 0 days.

(21) Appl. No.: 14/994,565

(22) Filed: Jan. 13, 2016

(51) Int. Cl.
*H02G 3/08* (2006.01)
*H02G 3/04* (2006.01)
*H02G 1/06* (2006.01)

(52) U.S. Cl.
CPC ............ *H02G 3/08* (2013.01); *H02G 1/06* (2013.01); *H02G 3/0481* (2013.01)

(58) Field of Classification Search
USPC .......................................... 174/84 R; 285/404
See application file for complete search history.

(56) References Cited

U.S. PATENT DOCUMENTS

| 834,684 | A | 10/1906 | Sibley et al. |
|---|---|---|---|
| 1,737,242 | A | 11/1929 | Hooley |
| 1,831,856 | A | 11/1931 | Fullman |
| 2,111,243 | A | 3/1938 | Hecht |
| 2,455,180 | A | 11/1948 | Kennedy |
| 3,454,291 | A | 7/1969 | Goldsobel et al. |
| 3,662,087 | A | 5/1972 | Singletary |
| 3,907,334 | A * | 9/1975 | Schera, Jr. ............... F16L 5/00 174/86 |
| 3,951,436 | A | 4/1976 | Hyde, Jr. |
| 4,004,831 | A | 1/1977 | Boutin |
| 4,438,954 | A | 3/1984 | Hattori |
| 4,641,863 | A | 2/1987 | Shemtov |

(Continued)

OTHER PUBLICATIONS

"Snap-lok Flexible Metal Conduit Connector," AFC Cable System, afcweb.com, accessed: Sep. 2015; http://www.afcweb.com/afc-fittings/snap-lok-flexible-metal-conduit-connector; whole document.

(Continued)

*Primary Examiner* — Dhirubhai R Patel
(74) *Attorney, Agent, or Firm* — Ware, Fressola, Maguire & Barber LLP

(57) ABSTRACT

A slip conduit connector for use in installing electrical conduit between two fix locations, has a hollow cylindrical member, at least one threaded bore positioned near a first end of the cylindrical member, the bore for receipt of a fastener, a flange circumferentially extending around the cylindrical member inward from a second end of the cylindrical member, and an outer threaded region extending from the second end toward said flange, the threaded region dimensioned to receive a locknut; wherein a slot is formed through the cylindrical member between the flange and the bore closest to the second end, the slot dimensioned to allow viewing inside the cylindrical member to ensure entry of an electrical conduit past all of the bores, thereby ensuring mechanical and electrical securement of the electrical conduit to the slip conduit connector when the fastener is secured in the at least one bore.

22 Claims, 6 Drawing Sheets

(56) References Cited

U.S. PATENT DOCUMENTS

| | | | |
|---|---|---|---|
| 4,645,645 A * | 2/1987 | Martinez | A61M 5/44 |
| | | | 165/163 |
| 4,874,908 A * | 10/1989 | Johansson | H01B 7/0045 |
| | | | 174/112 |
| 4,995,647 A | 2/1991 | Carey | |
| 5,165,735 A | 11/1992 | Nardi et al. | |
| 5,570,909 A | 11/1996 | Reynolds, Jr. | |
| 5,894,109 A | 4/1999 | Marik | |
| 6,106,031 A | 8/2000 | Guginsky | |
| 6,797,877 B1 | 9/2004 | Burnette | |
| 6,916,988 B1 | 7/2005 | Auray et al. | |
| 7,078,623 B1 | 7/2006 | Sheehan | |
| 7,404,582 B2 | 7/2008 | Scartozzi et al. | |
| 8,466,378 B1 | 6/2013 | Gretz | |
| 8,690,194 B1 | 4/2014 | Smith | |
| 8,708,374 B1 | 4/2014 | Smith | |
| 8,803,008 B2 * | 8/2014 | Chavan | H02G 3/0691 |
| | | | 174/655 |
| 2004/0069517 A1 | 4/2004 | Olson | |
| 2012/0086196 A1 | 4/2012 | Smith | |

OTHER PUBLICATIONS

"Arlington AnyBODY Universal Conduit Bodies," CableOrganizer.com, accessed: Sep. 2015; http://www.cableorganizer.com/arlington-industries/universal-conduit-bodies; whole document.

"Double Snap Cable/COnduit Connectors install in seconds," Thomas Net, news.thomasnet.com, Jun. 2, 2015; http://news.thomasnet.com/fullstory/double-snap-cable-conduit-connectors-install-in-seconds-20045032; whole document.

"Adjust-it Box-To-Box Connector"; Madison Electric Products, Inc.; Bedford Heights, Ohio; Dec. 2015; advertisement; whole document.

* cited by examiner

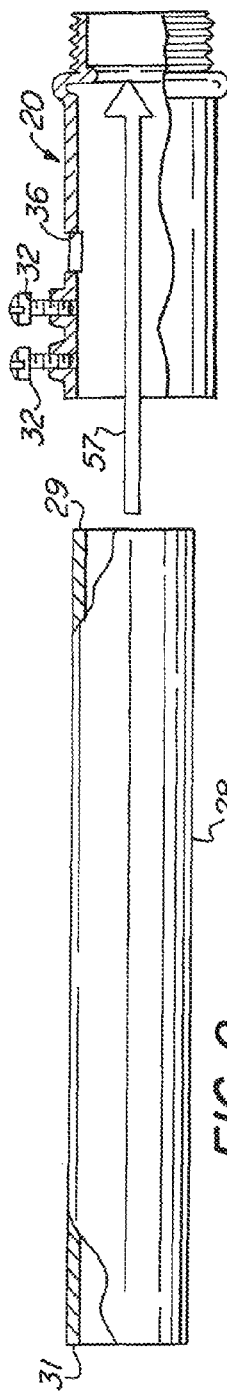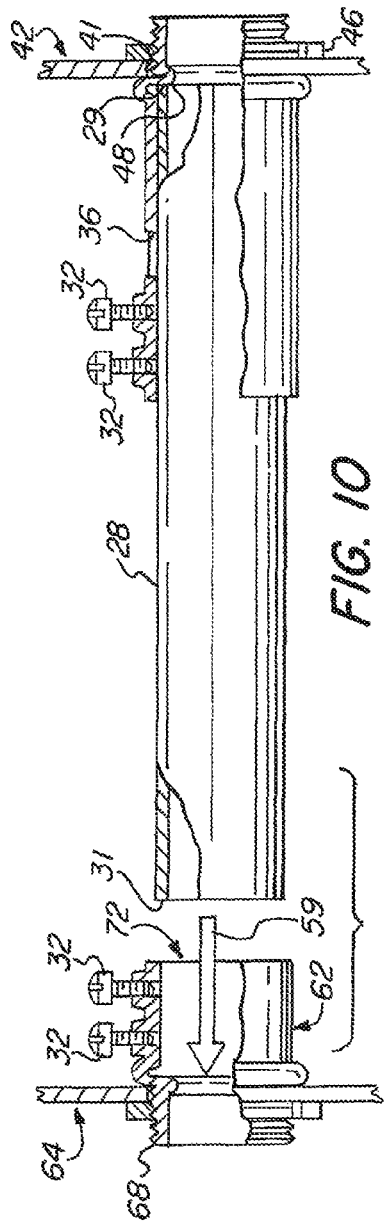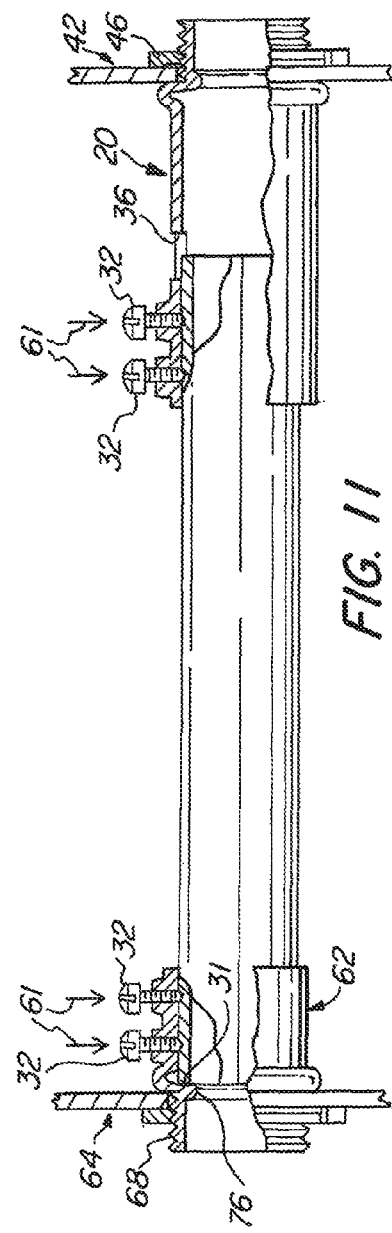

SLIP CONDUIT CONNECTOR AND SYSTEM AND METHOD OF INSTALLING ELECTRICAL CONDUIT WITH A SLIP CONDUIT CONNECTOR

TECHNICAL FIELD

The present invention relates to a slip conduit connector for use in installing electrical conduit between two fixed locations, such as between two mounted electrical panel boxes, as well as an associated electrical conduit system and method of using a slip conduit connector.

BACKGROUND OF THE INVENTION

There has been an ongoing need for providing an Underwriter Laboratories listed connector solution directed to installing electrical conduit between two mounted electrical panel boxes, the solution being easy to install and which minimizes associated waste of electrical conduit and the like.

When two electrical panel boxes have been mounted in a facility, there is occasionally a need for providing electrical conductors between the two electrical panels. In order to comply with electrical building codes and in order to meet with Underwriter Laboratories' approved components, there has been a need in the past of using a pair of conduit connectors associated with the two panel boxes and precisely sizing the length of an electrical conduit or electrical metallic tubing (EMT) between the two conduit connectors so that electrical conductors can pass therethrough without any exposure to the outside environment. Most conduit connectors use a pair of threaded bores for receipt of fasteners which are used to secure the electrical conduit to the conduit connector. If the electrical conduit is not precisely sized to the span between the two panel boxes, it may be difficult to assure that the electrical conduit is both mechanically and electrically bonded to each of the conduit connectors. For example, if the electrical conduit is inserted completely within one of the conduit connectors, it may be too short to be fully inserted in the second conduit connector so as to be in contact with the fasteners associated with the second conduit connector. In such a situation, there may be failure to have a proper mechanical and electrical bonding of the electrical conduit and thereby fail to comply with electrical codes for such installations.

Therefore, there has been a need to provide a way of determining if a proper mechanical and electrical bonding of an electrical conduit spanning two mounted electrical panel boxes has been achieved with the associated conduit connectors that are secured to the respective panel box.

SUMMARY OF THE INVENTION

The present invention relates to a slip conduit connector for use in installing electrical conduit between two fix locations, comprising a hollow cylindrical member having a first end and a second end, at least one threaded bore positioned near the first end passing through the cylindrical member, each bore for receipt of a fastener, and a flange circumferentially extending around the cylindrical member inward from the second end, and an outer threaded region extending from the second end of the cylindrical member toward said flange, the threaded region dimensioned to receive a locknut, wherein a slot is formed through the cylindrical member between the flange and the bore closest to the second end, the slot dimensioned to allow viewing inside the cylindrical member to ensure entry of an electrical conduit past all of the at least one bore, thereby ensuring mechanical and electrical securement of said electrical conduit to said slip conduit connector when said fastener is secured in the at least one bore.

Another embodiment of the present invention is the slip conduit connector as described above, comprising indicia positioned on the hollow cylindrical member, the indicia containing instructions regarding use of the slip conduit connector.

Another embodiment of the present invention is the slip conduit connector as described above, wherein the at least one threaded bore is two threaded bores adjacent one another.

A further embodiment of the present invention is the slip conduit connector as described above, wherein the two threaded bores are positioned along a longitudinal path of the hollow cylindrical member, and wherein the slot is positioned so as to be in linear alignment with the two threaded bores.

A further embodiment of the present invention is the slip conduit connector as described above, wherein the flange is integrally formed on the cylindrical member.

A still further embodiment of the present invention is the slip conduit connector as described above, wherein the hollow cylindrical member includes an internal stop in the vicinity of the flange, the stop dimensioned to contact an end of an electrical conduit sized for entry into the slip conduit connector.

Another embodiment of the present invention is the slip conduit connector as described above, wherein the threaded region of the cylindrical member has an inner diameter less than an inner diameter of a remainder of the hollow cylindrical member, thereby forming said stop at one end of the threaded region in proximity to said flange.

A further embodiment of the present invention is the slip conduit connector as described above, wherein the hollow cylindrical member includes a plurality of longitudinal ribs extending along an outer surface of the hollow cylindrical member.

Another embodiment of the present invention is the slip conduit connector as described above, further comprising a second flange positioned on the first end of the hollow cylindrical member.

Another embodiment of the present invention is the slip conduit connector as described above, wherein the hollow cylindrical member is fabricated from zinc plated steel.

A further embodiment of the present invention is the slip conduit connector as described above, wherein the hollow cylindrical member is fabricated from zinc alloy.

Another embodiment of the present invention is an electrical conduit system to span a first electrical panel box and a second electrical panel box separated from each other comprising an electrical conduit, a conduit connector having a hollow cylindrical member dimensioned to receive said electrical conduit, the cylindrical member with an outer threaded region positioned at a first end, the threaded region dimensioned to receive a locknut so as to secure the conduit connector to the first panel box by passage of said threaded region through an opening in said first panel box and tightening said locknut on the threaded region, the conduit connector having at least one threaded bore passing through the conduit connector for receipt of a fastener to secure said electrical conduit positioned inside the hollow cylindrical member, and a slip conduit connector having a hollow cylindrical member dimensioned to receive said electrical conduit, the hollow cylindrical member having a first end and a second end, at least one threaded bore positioned near the first end of the cylindrical member for receipt of a fastener, a flange circumferentially extending around the cylindrical member inward from the second end, and an outer threaded region extending from the second end of the cylindrical member toward said flange, the threaded region dimensioned to receive a locknut so as to secure the slip conduit connector to the second panel box by passage of said threaded region through an opening in said second panel box and tightening said locknut on the threaded region, the cylindrical member having a slot formed therein between the flange and the bore closest to the second end, the slot dimensioned to allow viewing inside the cylindrical member to ensure entry of the electrical conduit past all of the at least one bore, thereby ensuring mechanical and electrical securement of said electrical conduit to said slip conduit connector when said fastener is secured to the at least one bore.

Another embodiment of the present invention is the electrical conduit system as described above, wherein the hollow cylindrical member of the slip conduit connector further comprises indicia positioned on the hollow cylindrical member, the indicia containing instructions regarding use of the slip conduit connector.

A further embodiment of the present invention is the electrical conduit system as described above, wherein the hollow cylindrical member of the slip conduit connector includes an internal stop in the vicinity of the flange, the stop dimensioned to contact an end of an electrical conduit sized for entry into the slip conduit connector.

Another embodiment of the present invention is a method of installing electrical conduit so as to span a first electrical panel box and a second electrical panel box separated from each other, comprising attaching a conduit connector having an outer threaded region at a first end through an opening in said first panel box and tightening a locknut to the threaded region of the conduit connector so as to secure the conduit connector to the first panel box, inserting a first end of the electrical conduit into a slip conduit connector, the slip conduit connector having a hollow cylindrical member dimensioned to receive said electrical conduit, attaching the slip conduit connector having an outer threaded region through an opening in the second panel box and tightening a locknut to the threaded region of the slip conduit connector so as to secure the slip conduit connector to the second panel box, inserting a second end of the electrical conduit into a second end of the conduit connector so as to contact an internal stop of the conduit connector, determining if the electrical conduit is visible in a slot formed through the cylindrical member of the slip conduit connector, and if visible in said slot, securing the electrical conduit to the conduit connector and to the slip conduit connector.

Another embodiment of the present invention is a method of installing electrical conduit so as to span a first electrical panel box and a second electrical panel box separated from each other as described above, wherein the electrical conduit is secured to the conduit connector by a fastener threaded into a threaded bore formed in the conduit connector and the electrical conduit is secured to the slip conduit connector by a fastener threaded into said threaded bore formed in the cylindrical member of the slip conduit connector.

BRIEF DESCRIPTION OF THE DRAWINGS

For a better understanding of the nature and objects of the present invention, reference is made to the following detailed description taken in conjunction with the following drawings in which:

FIG. 9 is a side view of the electrical conduit and slip conduit connector both partially in cross-section.

FIG. 10 is a side view of the electrical conduit inserted into the slip electrical conduit installed in a second panel box and aligned with a conduit connector installed in a first panel box, all elements in partial cross-section.

FIG. 11 is a side view of the electrical conduit system according to the present invention, showing the conduit connector, electrical conduit, and slip conduit connector after final assembly installed between two electrical panel boxes, all elements in partial cross-section.

DETAILED DESCRIPTION

Figure 1:
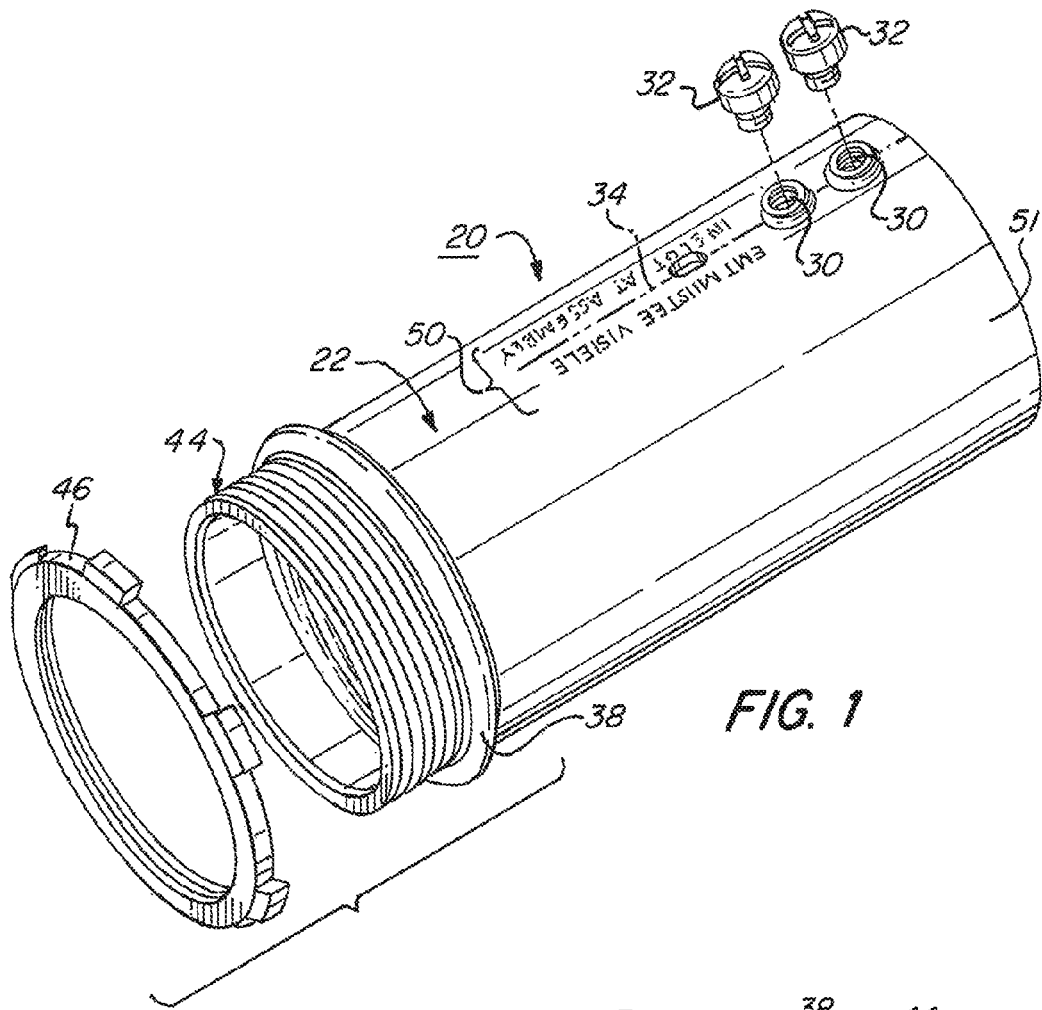
FIG. 1 is a perspective view of a slip conduit connector according to the present invention showing an associated locknut.

FIG. 1 illustrates a perspective view of an embodiment of a slip conduit connector 20 according to the present invention. The slip conduit connector has a hollow cylindrical member 22 having a first end 24 and a second end 26. The hollow cylindrical member is dimensioned for receipt of an electrical conduit 28 as seen in FIGS. 9 and 10. This embodiment is preferably fabricated from zinc plated steel.

As seen in FIG. 1, the hollow cylindrical member has at least one threaded bore 30, the threads dimensioned for receipt of a corresponding fastener 32 which when threaded into the bore can make electrical and mechanical contact with the electrical conduit 28 as seen in FIG. 10.

FIG. 1 shows that this embodiment of the present invention can preferably have two threaded bores near first end 24. These threaded bores may be in longitudinal alignment with the hollow cylindrical member as seen by phantom dashed longitudinal line 34. A closed-ended slot 36 also extends through the hollow cylindrical member 22 and is preferably positioned near threaded bore 30 closest to second end 26 of the hollow cylindrical member.

The hollow cylindrical member further includes a flange 38 circumferentially extending around the cylindrical member inward from second end 26. This flange is dimensioned so as to contact the periphery 40 surrounding a knockout hole in an electrical panel box 42 as shown in FIGS. 9 and 10. The closed-ended slot is positioned between flange 8 and bore 30 closest to flange 38.

FIG. 1 also shows that the cylindrical member has an outer threaded region 44 extending from second end 26 of the cylindrical member. This outer threaded region when inserted through a knockout hole of an electrical panel box extends into the panel box so as to allow the slip conduit connector to be secured to the panel box by tightening associated locknut 46.

Figure 4:
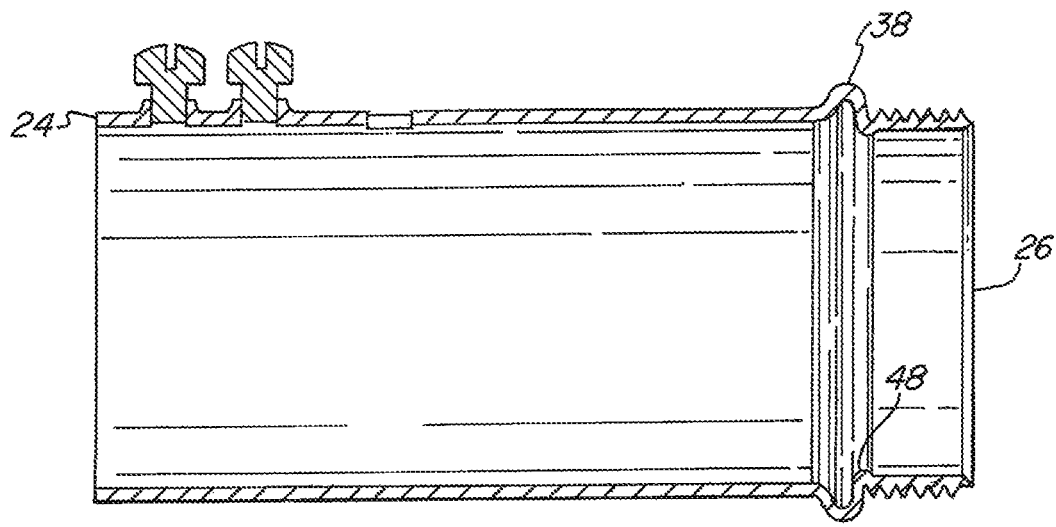
FIG. 4 is a cross-sectional view of the slip conduit connector taken along line 4-4 of FIG. 2.
Figure 5:
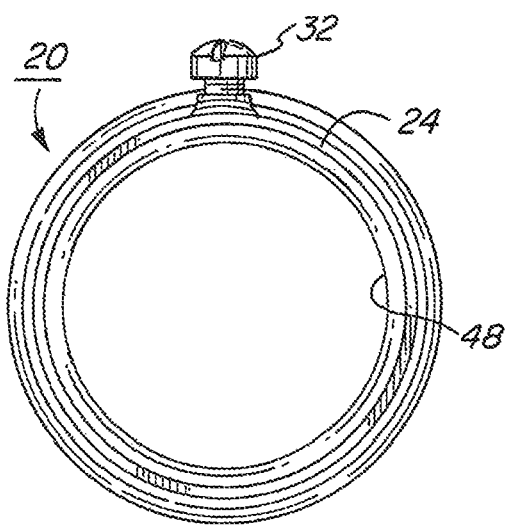
FIG. 5 is a rear view of the slip conduit connector shown in FIG. 1.
Figure 6:
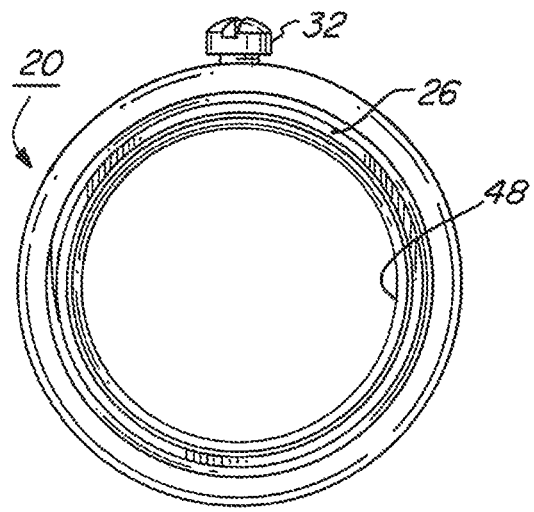
FIG. 6 is a front view of the slip conduit connector shown in FIG. 1.

FIG. 4 and FIG. 10 show that the cylindrical member also includes an internal stop 48 which has an inner diameter sufficient to stop entry of an electrical conduit designed to fit into the hollow cylindrical member, thereby preventing the conduit from passing into the associated panel box. The internal stop may, as shown in FIGS. 4 and 10, be the interior portion of threaded region 44. The internal stop may be formed in other ways well-known in the art (e.g., radially projecting fingers or the like).

Figure 2:
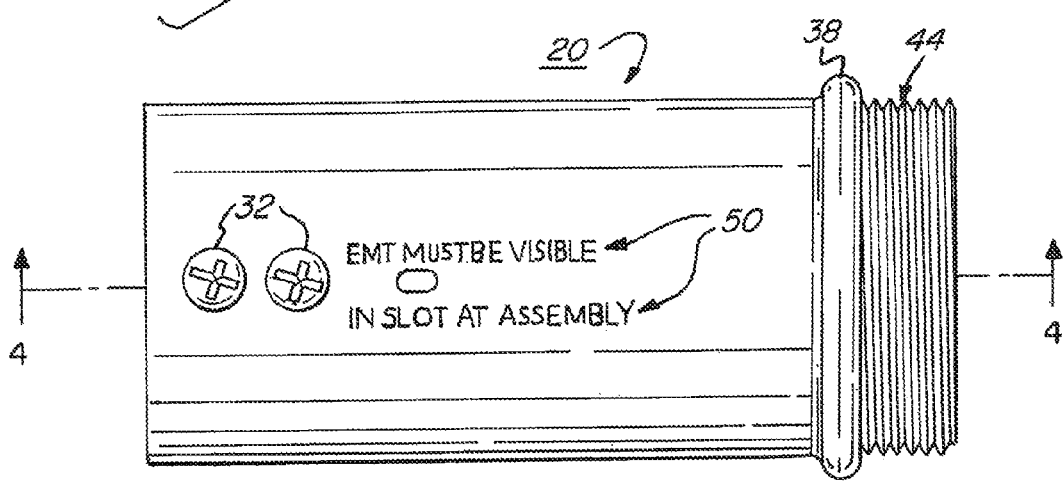
FIG. 2 is a top view of the slip conduit connector.
Figure 3:
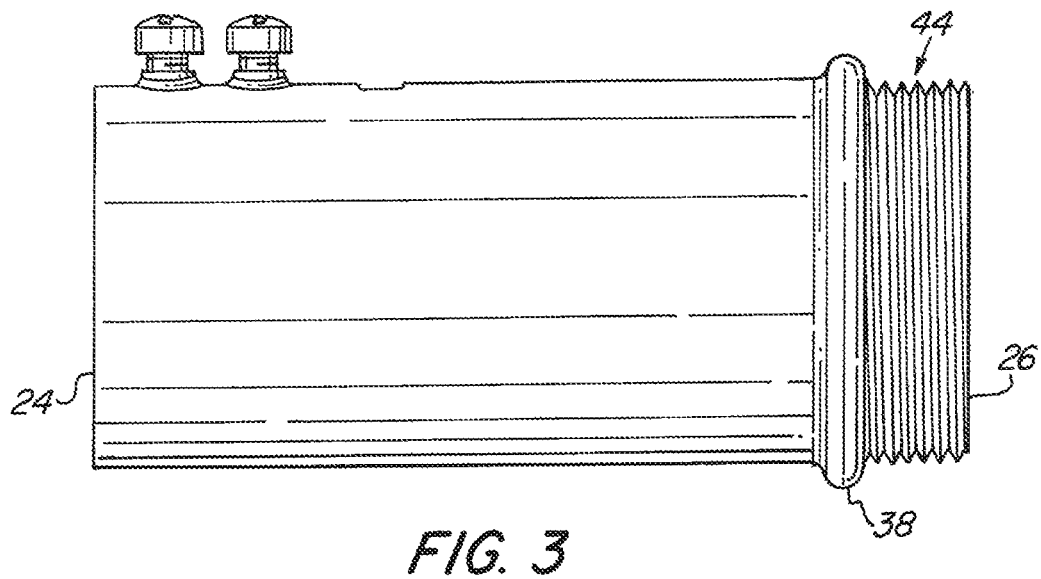
FIG. 3 is a side view of the slip conduit connector shown in FIG. 1.

FIGS. 1 and 2 show that indicia 50 may be placed on surface 51 of the hollow cylindrical member in the vicinity of slot 36. This indicia typically contains instructions associated with use of the slip conduit connector. Thus, in FIG. 2, the indicia 50 instruct the user that the electrical metallic tubing (EMT) or electrical conduit 28 must be visible in slot 36 at the time of assembling the slip conduit connector as described more fully below.

The slip conduit connector can be fabricated from any type of electrical conducting tubing normally associated with electrical conduit. Such materials include steel, zinc alloy steel, zinc plated steel and the like.

Figure 7:
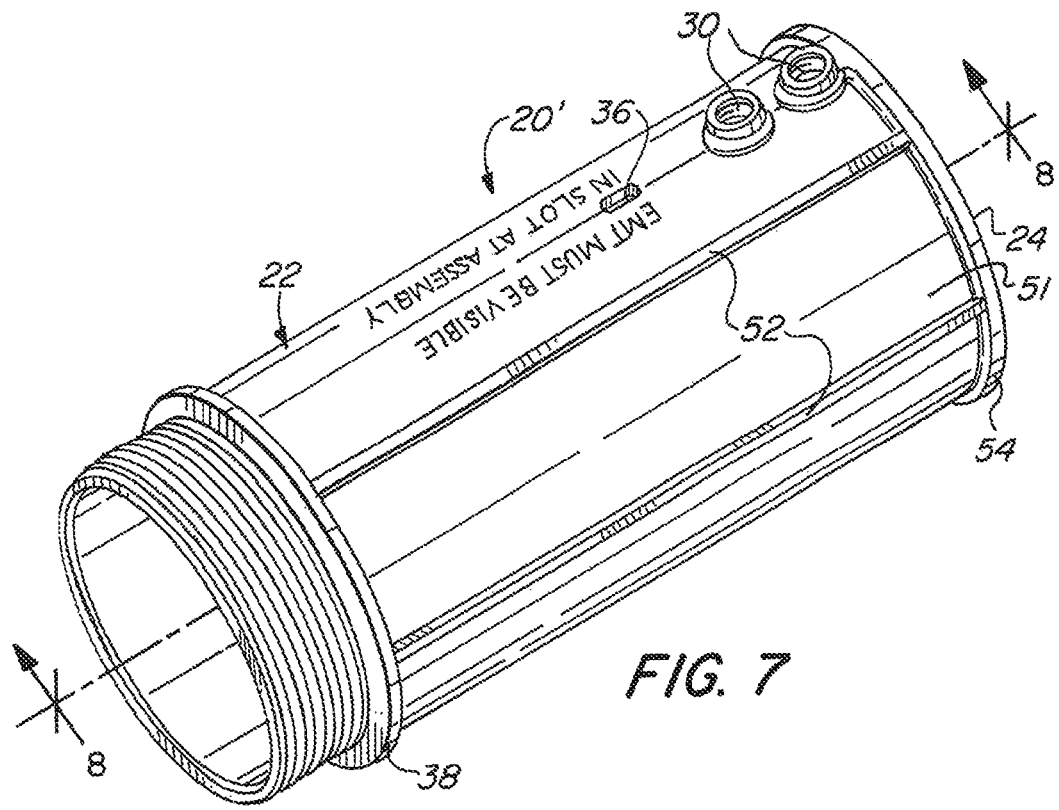
FIG. 7 is a perspective view of another embodiment of the slip conduit connector having longitudinal ribs on its cylindrical member.
Figure 8:
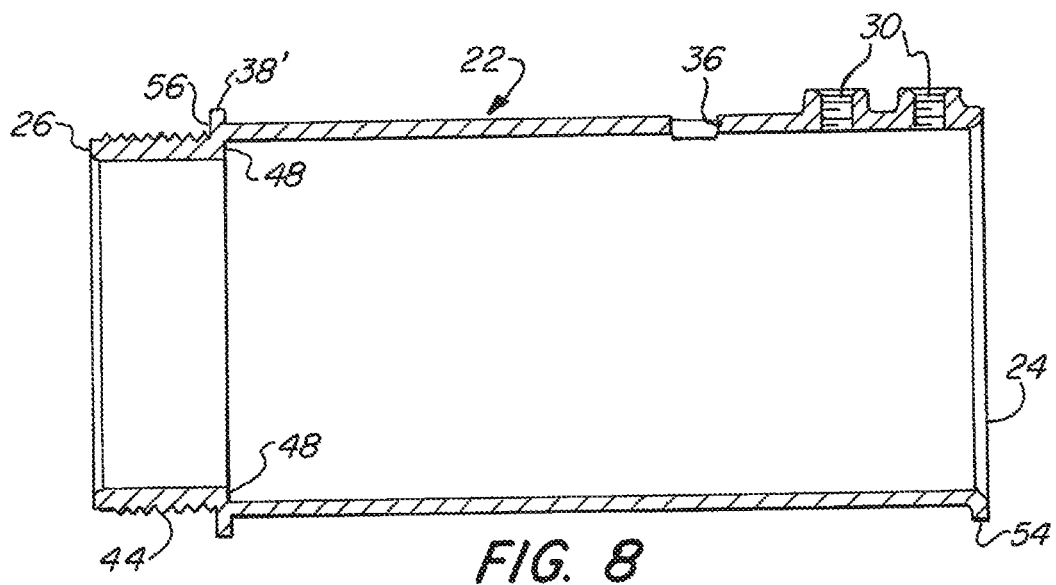
FIG. 8 is a cross-sectional view of the slip conduit connector taken along line 8-8 of FIG. 7.

FIGS. 7 and 8 show an alternative embodiment 20' of the slip conduit connector which is essentially the same as that shown in FIG. 1 except it includes a plurality of longitudinally extending ribs 52 on surface 51 of the hollow cylindrical member, as well as a second flange 54 positioned at first end 24 of the hollow cylindrical member. In this embodiment, flange 38 has a flat surface 56 closest to second end 26. This embodiment is preferably fabricated form a zinc alloy.

Assembly of an Electrical Conduit System

FIGS. 9-13 illustrate an overall electrical conduit system 60 which comprises a conduit connector 62, an electrical conduit (electrical metallic tubing) 28 and a slip conduit connector 20 according to the present invention.

Figure 12:
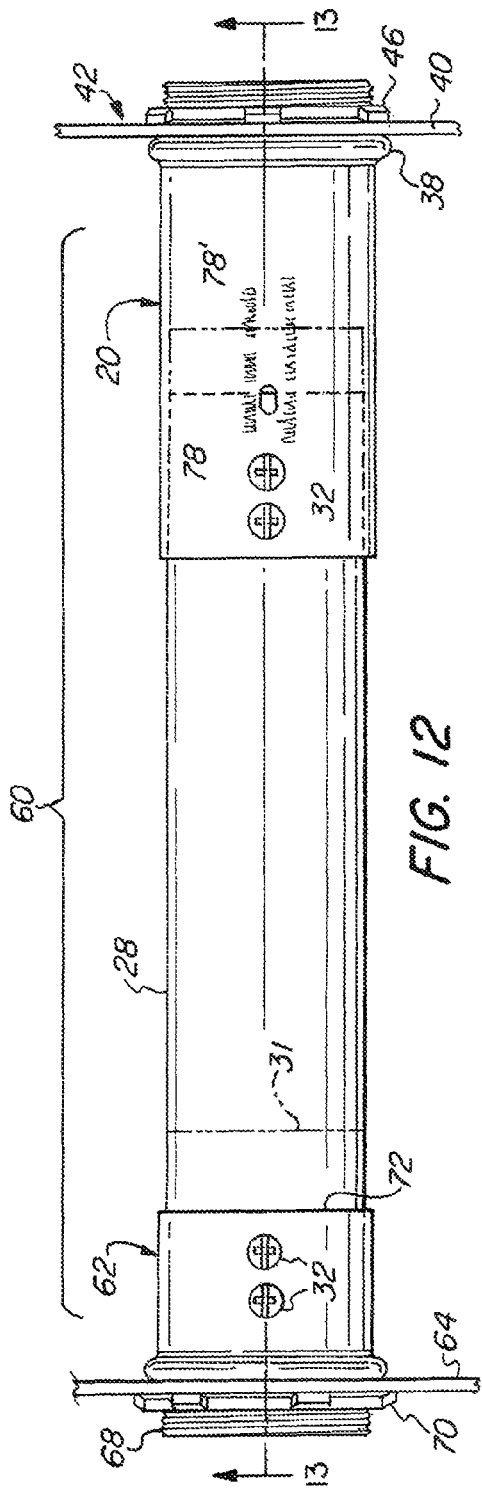
FIG. 12 is a top view of the electrical conduit system illustrating the installation of the slip conduit connector with a second panel box and the associated electrical conduit being slid into the slip conduit connector so as to allow its insertion into an associated conduit connector connected to a first panel box.
Figure 13:
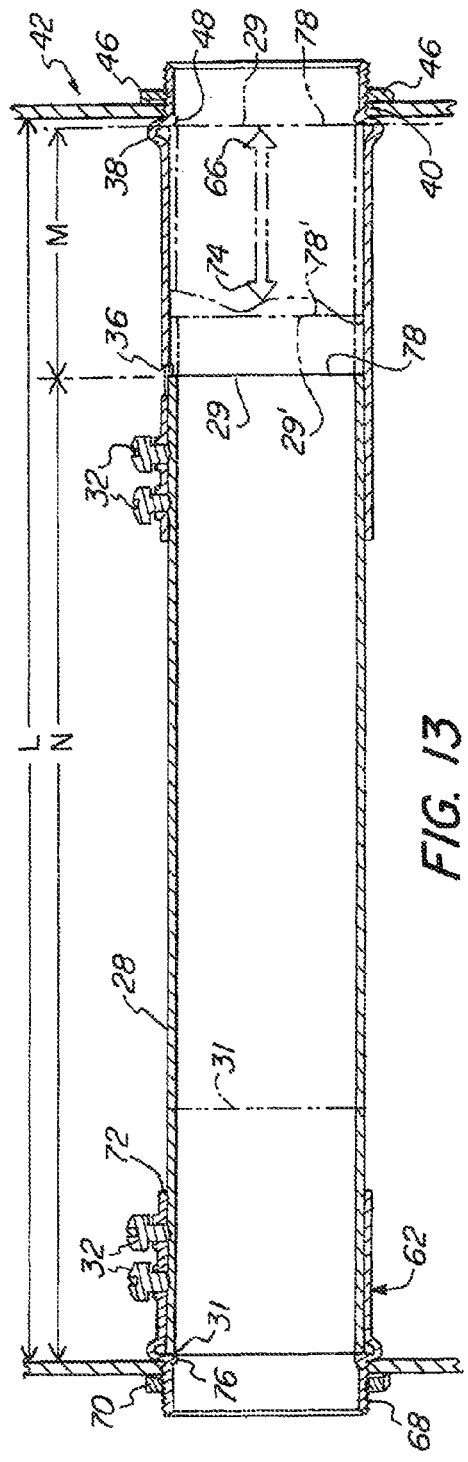
FIG. 13 is a cross-sectional view taken along line 13-13 of FIG. 12 again showing the installation of the slip conduit connector with a second panel box and the insertion of the electrical conduit into the slip conduit connector so as to allow the conduit to be aligned with and then inserted into the associated conduit connector.

As seen in FIGS. 11-13, the electrical conduit system 60 allows for the electrical conduit to span between a first panel box 64 and a second panel box 42 when the panel boxes have previously been mounted to a corresponding structure (not shown) and thus cannot be moved relative to each other.

As seen in FIGS. 9-13, electrical conduit 28 is initially inserted into slip conduit connector 20 (see arrow 57) so that first end 29 of electrical conduit 28 contacts internal stop 48 as shown in FIGS. 9 and 10 and as shown in phantom in FIGS. 12 and 13. Such insertion of conduit 28 into slip conduit connector 20 is typically done prior to the slip conduit connector being inserted into the knockout hole (see knockout hole periphery 41) of second panel box 42 and subsequent securement thereto by locknut 46 (see FIG. 10). Such insertion of the conduit into slip conduit connector 20 is also shown by arrow tip 66 in FIG. 13 (realizing that the insertion is typically done before the slip conduit connector is inserted into panel box 42 in order to have clearance with respect to conduit connector 62). When in this position, FIG. 10 shows that second end 31 of electrical conduit 28 is positioned outside of opening 72 of conduit connector 62 (also see second end 31 shown in phantom in FIG. 13). FIG. 10 shows that the electrical conduit is aligned with conduit connector 62. The slip conduit connector is secured to second panel box 42 by locknut 46, while conduit connector 62 is secured to first panel box 64 by associated locknut 70. Because the electrical conduit is aligned with and outside of opening 72 of conduit connector 62, there is no interference with the conduit connector during this portion of the assembly. FIGS. 10 and 11 show that once the electrical conduit is positioned in the slip conduit connector (see also arrow tip 74 in FIG. 13) it can be extended in the direction of arrow 59 thus moving toward the conduit connector until it contacts an internal stop 76 of the conduit connector (see second end 31 in solid form in contact with internal stop 76).

It is at this time in the installation (assembly) that the installer can determine if first end 29 of conduit 28 is visible through slot 36. If the conduit end is visible through slot 36, then fasteners 32 associated with the slip conduit connector and the conduit connector can be tightened (see arrow 61) so as to make electrical and mechanical contact with the conduit as best seen in FIG. 11.

In addition, FIGS. 9 and 10 also show that second end 78 of conduit 28 can, depending upon the length of the electrical conduit, actually extend beyond slot 36 so that when viewed through slot 36, the conduit completely fills the slot 36. This is shown where first end 29 is positioned beyond slot 36 (see FIG. 13, first end 29'). Fasteners 32 can then be tightened for both the slip conduit connector 20 and the conduit connector 62. Thus, in either situation it is assured that the electrical conduit will make both electrical and mechanical contact with fasteners 32 thus insuring that the overall electrical conduit system meets electrical code standards.

If the electrical conduit 28 is of an insufficient length to be visible (partially or fully) in closed-ended slot 36 when second end 31 is in contact with internal stop 76 of the electrical connector 62, then the installer is given visible warning that a longer electrical conduit is necessary in order to comply with electrical code. The electrical conduit would then be replaced with a longer electrical conduit.

Method of Assembly

The overall method of assembly for the electrical conduit system is as described above with reference to FIGS. 9 and 10. Thus, initially, the conduit connector 62 is secured to first panel box 64 with its associated locknut 70 tightened around outer threaded region 68 of the conduit connector. The first end 29 of the electrical conduit is inserted into the slip conduit connector 20 so as to contact an internal stop 48 of the slip conduit connector. The slip conduit connector is secured to second panel box 42 by locknut 46. The conduit is then inserted into conduit connector 62 until it contacts internal stop 76. At this time, if the electrical conduit is visible in closed-ended slot 36, then fasteners 32 are tightened on both the conduit connector and the slip conduit connector. This ensures that a proper electrical and mechanical bonding has been achieved. If the electrical conduit is not visible (partially or fully) in closed-ended slot 36, the installer is thereby given a visible warning to remove the electrical conduit and install a longer electrical conduit.

Thus, the overall system, method and slip conduit connector of the present invention provides an easy and simple method of ensuring that an electrical conduit can span between two mounted panel boxes, while eliminating the need for moving the panel boxes relative to each other and yet ensuring that the overall span of electrical conduit between the panel boxes meets electrical code requirements.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A slip conduit connector for use in installing electrical conduit between two fixed locations, comprising:
    a hollow cylindrical member having a first end and a second end, at least one threaded bore positioned near the first end passing through the cylindrical member, each bore for receipt of a fastener; and
    a flange circumferentially extending around the cylindrical member inward from the second end, and an outer threaded region extending from the second end of the cylindrical member toward said flange, the threaded region dimensioned to receive a locknut;
    wherein a closed-ended slot is formed through the cylindrical member between the flange and the at least one threaded bore closest to the second end, the slot dimensioned to allow viewing inside the cylindrical member to ensure entry of an electrical conduit past all of the at least one threaded bore, thereby ensuring mechanical and electrical securement of said electrical conduit to said hollow cylindrical member when said fastener is secured in the at least one bore.

2. The slip conduit connector according to claim 1, further comprising indicia positioned on the hollow cylindrical member, the indicia containing instructions regarding use of the slip conduit connector.

3. The slip conduit connector according to claim 2, wherein the at least one threaded bore is two threaded bores adjacent one another.

4. The slip conduit connector according to claim 3, wherein the two threaded bores are positioned along a longitudinal path of the hollow cylindrical member, and wherein the closed-ended slot is positioned so as to be in linear alignment with the two threaded bores.

5. The slip conduit connector according to claim 4, wherein the flange is integrally formed on the cylindrical member.

6. The slip conduit connector according to claim 5, wherein the hollow cylindrical member includes an internal stop in the vicinity of the flange, the stop dimensioned to contact an end of an electrical conduit sized for entry into the slip conduit connector.

7. The slip conduit connector according to claim 6, wherein the threaded region of the cylindrical member has an inner diameter less than an inner diameter of a remainder of the hollow cylindrical member, thereby forming said stop at one end of the threaded region in proximity to said flange.

8. The slip conduit connector according to claim 1, wherein the at least one threaded bore is two threaded bores adjacent one another.

9. The slip conduit connector according to claim 1, wherein the two threaded bores are positioned along a longitudinal path of the hollow cylindrical member, and wherein the slot is positioned so as to be in linear alignment with the two threaded bores.

10. The slip conduit connector according to claim 1, wherein the flange is integrally formed on the cylindrical member.

11. The slip conduit connector according to claim 1, wherein the hollow cylindrical member includes an internal stop in the vicinity of the flange, the stop dimensioned to contact an end of an electrical conduit sized for entry into the slip conduit connector.

12. The slip conduit connector according to claim 11, wherein the threaded region of the cylindrical member has an inner diameter less than an inner diameter of a remainder of the hollow cylindrical member, thereby forming said stop at one end of the threaded region in proximity to said flange.

13. The slip conduit connector according to claim 1, wherein the hollow cylindrical member is fabricated from zinc plated steel.

14. The slip conduit connector according to claim 1, wherein the hollow cylindrical member is fabricated from zinc alloy.

15. The slip conduit connector according to claim 1, wherein the hollow cylindrical member includes a plurality of longitudinal ribs extending along a surface of the hollow cylindrical member.

16. The slip conduit connector according to claim 15, further comprising a second flange positioned on the first end of the hollow cylindrical member.

17. An electrical conduit system to span a first electrical panel box and a second electrical panel box separated from each other comprising:
    an electrical conduit;
    a conduit connector having a hollow cylindrical member dimensioned to receive said electrical conduit, the cylindrical member with an outer threaded region positioned at a first end, the threaded region dimensioned to receive a locknut so as to secure the conduit connector to the first panel box by passage of said threaded region through an opening in said first panel box and tightening said locknut on the threaded region, the conduit connector having at least one threaded bore passing through the conduit connector for receipt of a fastener to secure said electrical conduit positioned inside the hollow cylindrical member; and
    a slip conduit connector having a hollow cylindrical member dimensioned to receive said electrical conduit, the hollow cylindrical member having a first end and a second end, at least one threaded bore positioned near the first end of the cylindrical member for receipt of a fastener, a flange circumferentially extending around the cylindrical member inward from the second end, and an outer threaded region extending from the second end of the cylindrical member toward said flange, the threaded region dimensioned to receive a locknut so as to secure the slip conduit connector to the second panel box by passage of said threaded region through an opening in said second panel box and tightening said locknut on the threaded region, the cylindrical member having a closed-ended slot formed therein between the flange and the at least one threaded bore closest to the second end, the slot dimensioned to allow viewing inside the cylindrical member to ensure entry of the electrical conduit past all of the at least one threaded bore, thereby ensuring mechanical and electrical securement of said electrical conduit to said slip conduit connector when said fastener is secured to the at least one bore.

18. The electrical conduit system according to claim 17, wherein the hollow cylindrical member of the slip conduit connector further comprises indicia positioned on the hollow cylindrical member, the indicia containing instructions regarding use of the slip conduit connector.

19. The electrical conduit system according to claim 17, wherein the hollow cylindrical member of the slip conduit connector includes an internal stop in the vicinity of the flange, the stop dimensioned to contact an end of an electrical conduit sized for entry into the slip conduit connector.

20. A method of installing electrical conduit so as to span a first electrical panel box and a second electrical panel box separated from each other, comprising:

attaching a conduit, connector having a first end and an outer threaded region at said first end, through an opening in said first panel box and tightening a threaded locknut to the threaded region of the conduit connector so as to secure the conduit connector to the first panel box;

inserting a first end of the electrical conduit into a slip conduit connector, the slip conduit connector having a hollow cylindrical member dimensioned to receive said electrical conduit, attaching the slip conduit connector having an outer threaded region through an opening in the second panel box and tightening a threaded locknut to the threaded region of the slip conduit connector so as to secure the slip conduit connector to the second panel box;

inserting a second end of the electrical conduit into a second end of the conduit connector so as to contact an internal stop of the conduit connector, determining if the electrical conduit is visible in a closed-ended slot formed through the cylindrical member of the slip conduit connector, and if visible in said closed-ended slot, securing the electrical conduit to the conduit connector and to the slip conduit connector.

21. The method according to claim 20, wherein the electrical conduit is secured to the conduit connector by a fastener threaded into a threaded bore formed in the conduit connector and the electrical conduit is secured to the slip conduit connector by a fastener threaded into said threaded bore formed in the cylindrical member of the slip conduit connector.

22. The method according to claim 20, wherein if the electrical conduit is not visible in the closed-ended slot of the cylindrical member, such non-visibility of the electrical conduit in said closed-ended slot provides a visible warning that a longer electrical conduit is necessary.

* * * * *